(12) United States Patent
Vercalli et al.

(10) Patent No.: US 10,127,421 B1
(45) Date of Patent: Nov. 13, 2018

(54) CONTROLLING USAGE OF PERISHABLE PRODUCTS WITH A SMART PORTABLE DEVICE

(71) Applicant: International Business Machines Corporation, Armonk, NY (US)

(72) Inventors: Emanuele Vercalli, Viterbo (IT); Vittorio Carullo, Rome (IT); Antonio Castellucci, Rome (IT); Aldo Spirito, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/693,885

(22) Filed: Sep. 1, 2017

(51) Int. Cl.
*G06N 5/04* (2006.01)
*G06N 99/00* (2010.01)
*G06Q 10/08* (2012.01)
*G01S 13/78* (2006.01)
*G08B 13/14* (2006.01)
*G08B 13/24* (2006.01)
*G08B 5/40* (2006.01)
(Continued)

(52) U.S. Cl.
CPC ..... *G06K 7/10386* (2013.01); *G06K 7/10297* (2013.01); *G08B 5/223* (2013.01)

(58) Field of Classification Search
CPC .......... G06N 5/04; G06N 99/00; G06Q 10/08; G01S 13/78; B61L 25/04; B01F 3/12; B01F 15/00
USPC ..... 340/10.6, 10.1, 10.5; 235/492, 375, 381, 235/383; 706/12
See application file for complete search history.

(56) References Cited

U.S. PATENT DOCUMENTS 6,411,567 B1 * 6/2002 Niemiec ............... A61J 7/0481
368/10
6,664,887 B1 * 12/2003 Fuchs .................... B65D 81/24
340/309.16
(Continued)

FOREIGN PATENT DOCUMENTS

CN 203229123 U 10/2013

OTHER PUBLICATIONS

Bogle, "Soon Your Medicine Bottle Could Remind You to Take Your Pills", Future Tense, The Citizen's Guide to the Future, Aug. 19, 2013. http://www.slate.com/blogs/future_tense/2013/08/19/smart_medicine_pa, last accessed Dec. 23, 2016. 5 pages.
(Continued)

*Primary Examiner* — Nam V Nguyen
(74) *Attorney, Agent, or Firm* — Stosch Sabo

(57) ABSTRACT

A solution is proposed for controlling usage of one or more perishable products. A corresponding method comprises storing an indication of one or more package events that may affect a duration of the perishable product being sensed by one or more sensors associated with the package; receiving an interrogation signal from a smart portable device of a user of the perishable product; retrieving package information being stored in association with the control unit in response to the interrogation signal, the package information comprising the indication of at least part of the package events; and transmitting the package information to the smart portable device for use by the smart portable device to control the usage of the perishable product according thereto.

18 Claims, 10 Drawing Sheets

(51) Int. Cl.
*G06K 7/10* (2006.01)
*G08B 5/22* (2006.01)

(56) References Cited

U.S. PATENT DOCUMENTS

| | | | |
|---|---|---|---|
| 6,691,058 B2* | 2/2004 | Blakley | G01D 9/005 |
| | | | 702/130 |
| 6,795,376 B2 | 9/2004 | Quine | |
| 6,839,304 B2 | 1/2005 | Niemiec et al. | |
| 7,212,100 B2 | 5/2007 | Terenna | |
| 7,503,506 B2* | 3/2009 | Harada | B60R 13/10 |
| | | | 235/492 |
| 7,675,424 B2* | 3/2010 | Debord | G01K 3/005 |
| | | | 340/309.16 |
| 9,202,323 B2* | 12/2015 | Queenan | G07C 9/00103 |
| 9,235,194 B2* | 1/2016 | Higgins | B65D 55/026 |
| 9,495,851 B1* | 11/2016 | Russell | G06Q 10/00 |
| 9,542,823 B1* | 1/2017 | Russell | G08B 13/2402 |
| 9,710,754 B2* | 7/2017 | Kaye | G06Q 10/08 |
| 2003/0122670 A1* | 7/2003 | Stern | G06Q 10/08 |
| | | | 340/568.1 |
| 2004/0019453 A1 | 1/2004 | Blakley | |
| 2014/0326744 A1 | 11/2014 | Ratnakar | |
| 2015/0048938 A1 | 2/2015 | Tew | |
| 2017/0017919 A1* | 1/2017 | Haimi | G06Q 10/06315 |
| 2017/0087524 A1* | 3/2017 | Deshpande | B01F 13/0022 |
| 2017/0284733 A1* | 10/2017 | Chiu | F25D 29/00 |
| | | | 29/3 |

OTHER PUBLICATIONS

Bogle, Ariel, "Smart medicine packaging could remind you to take your pills", Future Tense, The Citizen's Guide to the Future, Aug. 19 2013, 5 pages, <http://www.slate.com/blogs/future_tense/2013/08/19/smart_medicine_pa>.

Unknown, "Safe Medicine Monitor System (SMMS)", A.C.C. Systems, Inc., May 2015, 1 page, <http://www.accsystemsincn.com/wordpress/wp-content/uploads/2015/09/Safe Medicine Monitor System 2.pdf>.

* cited by examiner

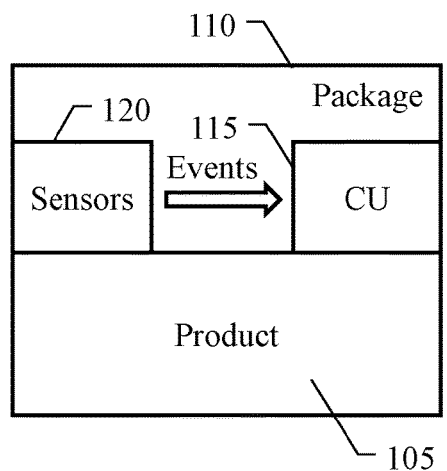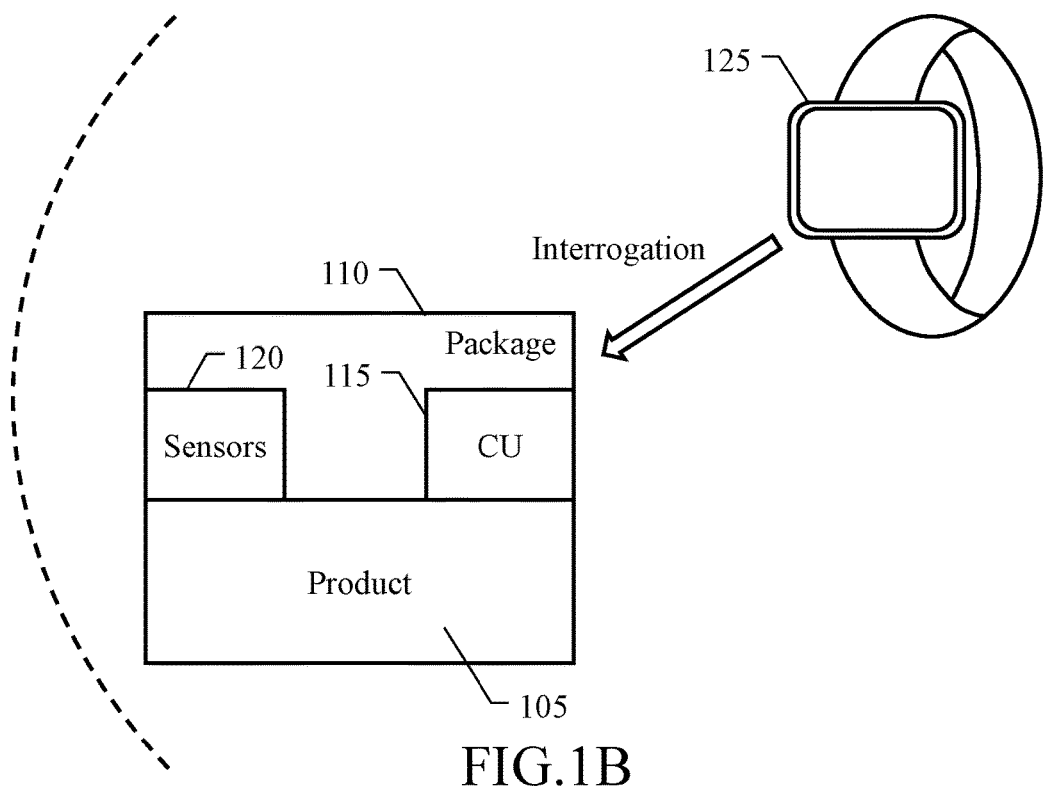

CONTROLLING USAGE OF PERISHABLE PRODUCTS WITH A SMART PORTABLE DEVICE

BACKGROUND

Many products may be perishable, since they degrade over time becoming less suitable for their intended use; generally, the perishable products should be used before corresponding expiration dates at which they are expected to become substantially unsuitable for use (for example, because they are of poor quality, ineffective, unsafe, dangerous). Typical perishable products are drugs. Indeed, the drugs may lose strength, may increase concentration of active ingredients, may develop harmful substances, may be contaminated over time; therefore, the drugs may cause missing treatments, overdoses, intoxications, illnesses if taken after their expiration dates (thereby causing more or less serious damages to their users).

In view of the above, most of the perishable products have their expiration dates that are printed on corresponding packages (for example, boxes). However, the expiration dates may be difficult to read (especially for old people) and they may be lost (for example, if the packages are damaged or binned).

In any case, the expiration dates that are provided on the packages are nominal values defined under the assumption that the perishable products have been maintained under prescribed conditions. However, many events may (adversely) affect the expiration dates of the perishable products. For example, the perishable products may have effective values of the expiration dates that are significantly shorter than their nominal values when the perishable products have undergone prolonged exposures to high temperatures, illuminations; moreover, most perishable products should be used within a short time once their packages have been opened. As a result, the nominal values of the expiration dates are set conservatively; however, this causes the discarding of many perishable products that instead are still suitable for use. In any case, it is very difficult (if not impossible) for the users of the perishable products to recognize the effective values of the expiration dates of the perishable products; this may cause the usage of perishable products that are of poor quality, ineffective, unsafe or dangerous (with all the above-mentioned risks for their users).

SUMMARY

Aspects of the disclosure may include a computer implemented method, computer program product, and system for controlling usage of a perishable product. In one embodiment, wherein under the control of a control unit associated with a package of the perishable product, the method comprises storing an indication of one or more package events that may affect a duration of the perishable product (being sensed by one or more sensors associated with the package) and transmitting package information (comprising the indication of at least part of the package events) to a smart portable device of a user of the perishable product in response to an interrogation signal received therefrom.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A-FIG. 1D show the general principles of the solution according to an embodiment of the present disclosure.

DETAILED DESCRIPTION

Figure 1C:
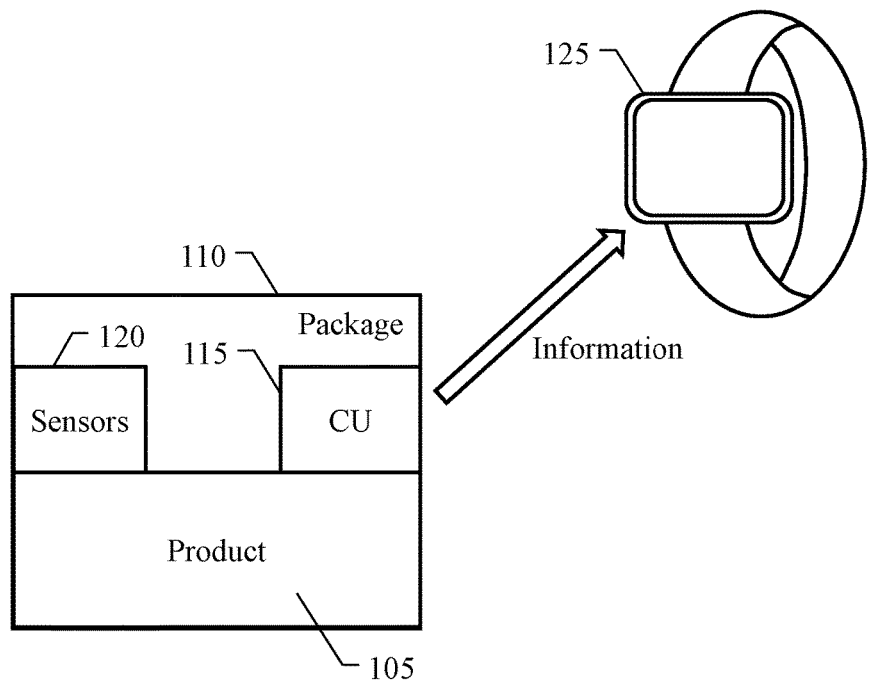

As described herein, a monitor system can be used with a perishable product. The monitoring system comprises a sensor assembly, an indicator, a user input and a processor. The processor is configured to determine from the output of the sensor assembly whether or not the perishable product has expired, and, in response to activation of the user input, to cause the indicator to indicate whether the perishable product has expired. The monitoring system may also log a complete history of the sensor information (or details of any events where the sensor outputs exceed a threshold value) to allow the cause of expiry to be identified (such as if the perishable product is being improperly handled or stored); this information may be obtained via a wired connection to a computer, a wireless connection or a display.

Moreover, a technique can be used for dynamically adjusting expiration dates displayed on consumer products by utilizing an LCD display for displaying an expiration date and messages, sensors for monitoring environmental conditions, a clock for counting back the expiration date, and a controller for determining messages and adjustments to the displayed expiration date based on monitored environmental conditions. In this way, expiration dates can be provided on products; the display may also be part of a remote viewing station, or part of a hand held device that receives radio frequency signals from the controller instructing what expiration date should be displayed (with the hand held display that would show the expiration date for a package to which the hand held display unit is being proximally held). The controller is preprogrammed to recognize environmental trigger conditions while monitoring the sensors; upon detecting an environmental trigger condition, the controller than adjusts the expiration date.

With reference in particular to FIG. 1A-FIG. 1D, the general principles are shown of the solution according to an embodiment of the present disclosure.

Starting from FIG. 1A, one or more (perishable) products 105 (for example, drugs) are provided in corresponding packages 110 (for example, bottles, blisters). A control unit 115 (for example, a Micro Controller Unit or MCU) and one or more sensors 120 (for example, for detecting opening/closing of the bottle, measuring environment parameters such as illumination, temperature) are associated with each package 110. The control unit 115 stores an indication of any package events sensed by the sensors 120 (for example, into a mass memory thereof); the package events are events that may affect a duration of the product 105 (for example, when the bottle is opened, the illumination or temperature is too high).

Continuing to FIG. 1B, a user of the product 105 has a smart portable device 125 (for example, a smart-watch). The smart portable device 125 broadcasts an interrogation signal (for example, a reset command in the NFC technology); the interrogation signal has a corresponding transmission range around the smart portable device 125. The control unit 115 of each (current) product 105, which is within the transmission range from the smart portable device 125, receives the interrogation signal.

Passing to FIG. 1C, in response to the interrogation signal the control unit 115 retrieves package information that is stored in association therewith (for example, in its mass memory); the package information comprises the indication of the package events, or at least part thereof (for example, the ones detected after a last receipt of the interrogation signal from the same smart portable device 125). The control unit 115 then transmits the package information to the smart portable device 125.

Figure 1D:
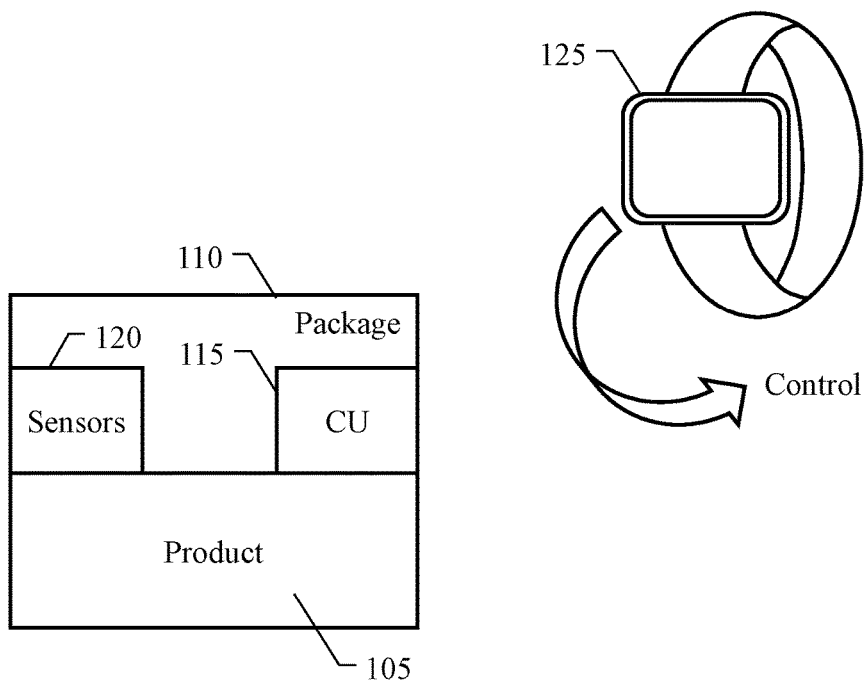

Passing to FIG. 1D, the smart portable device 125 receives the package information from the control unit 115 (in response to the interrogation signal). The smart portable device 125 then controls the usage of the corresponding product 105 according to its package information. For example, the smart portable device 125 calculates an effective expiration date of the product 105 by setting it to a predefined period from the opening of its package 110, reduced in case of exposure to high temperature or illumination; the smart portable device 125 then outputs an alarm message when the effective expiration date has passed.

As a result, the usage of the products 105 may be controlled according to the actual conditions in which they have been maintained (as defined by their package events). In this way, the products 105 may be used as long as possible, without discarding products 105 that are still suitable for use but at the same time without the risk of using products 105 that are of poor quality, ineffective, unsafe or dangerous.

These results may be achieved with control units 115 that are simple, cost effective and easy to configure (since most of the processing operations are demanded to the smart portable device 125). At the same time, the smart portable device 125 allows performing relatively complex activities (for example, reacting in real-time to information downloaded from a communication network, such as in case of withdrawal of specific products 105 from the market).

All of the above makes the above-mentioned solution of general applicability, flexible and very effective.

Figure 2A:
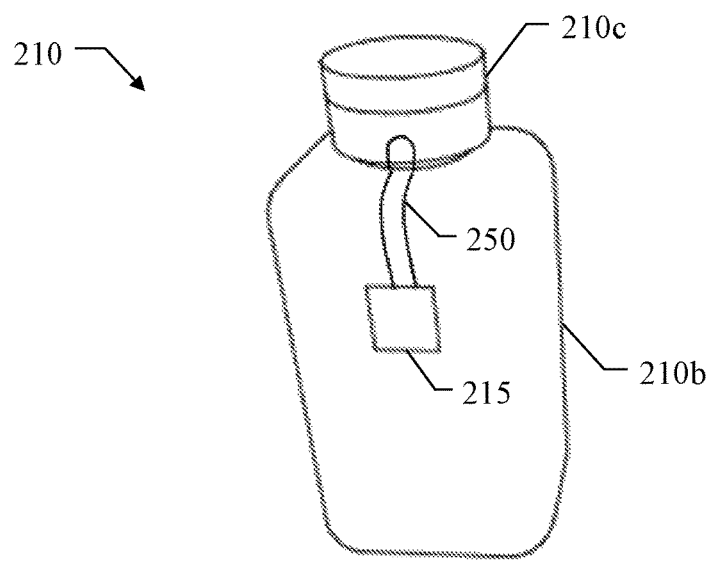
FIG. 2A-FIG. 2B show an example of a package that may be used to practice the solution according to an embodiment of the present disclosure in different operative conditions.
Figure 2B:
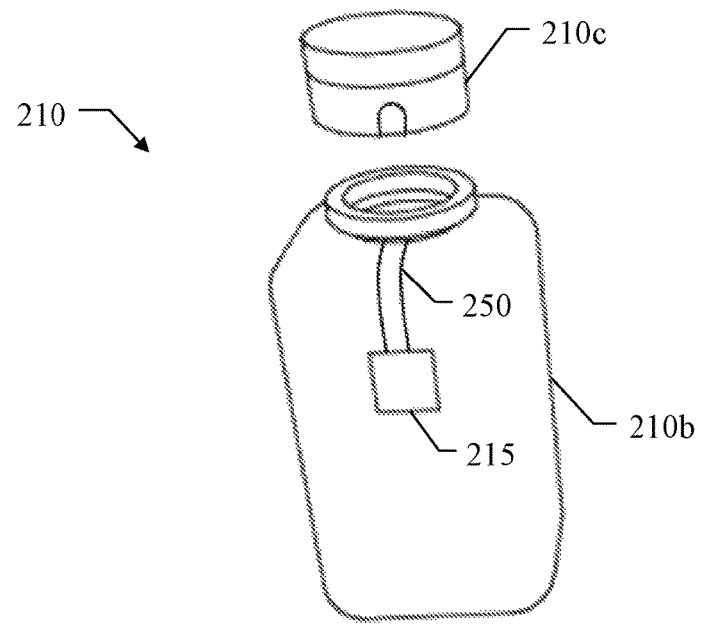

With reference now to FIG. 2A-FIG. 2B, an example is shown of the package that may be used to practice the solution according to an embodiment of the present disclosure in different operative conditions.

Starting from FIG. 2A, the product is contained as a whole in a container 210. For example, the container 210 comprises a bottle 210b with a (rotating) cup 210c (also referred to as a cap or lid) for a bulk substance (such as a liquid) or unpackaged product doses (such as pills). An electronic circuit 215 (comprising the above-mentioned control unit and sensors), for example, integrated on one or more chips of semiconductor material, is embedded in the container 210 (for example, within the bottle 210b). One of the sensors of the package is implemented by an (opening) electric circuit 250 that is used to detect the opening of the container 210. Particularly, the electric circuit 250 is formed by a thin (electrically) conductive wire that bridges between the bottle 210b and the cup 210c, with its ends that are connected to corresponding terminals of the control unit in the electronic circuit 215 so as to create a short circuit; the electric circuit 250 is applied to the container 210 after the bottle 210b has been filled with the product and then closed with the cup 210c.

Passing to FIG. 2B, the container 210 is opened by removing the cup 210c from the bottle 210b (for example, by rotating it counterclockwise). During this operation, the conductive wire of the electric circuit 250 is broken (between the bottle 210b and the cup 210c) so as to become an open circuit. As a result, the control unit in the electronic circuit 215 may detect the opening of the container 210 by monitoring a resistance of the electric circuit 250 (e.g. when it passes from zero to infinite ideally).

Figure 3:
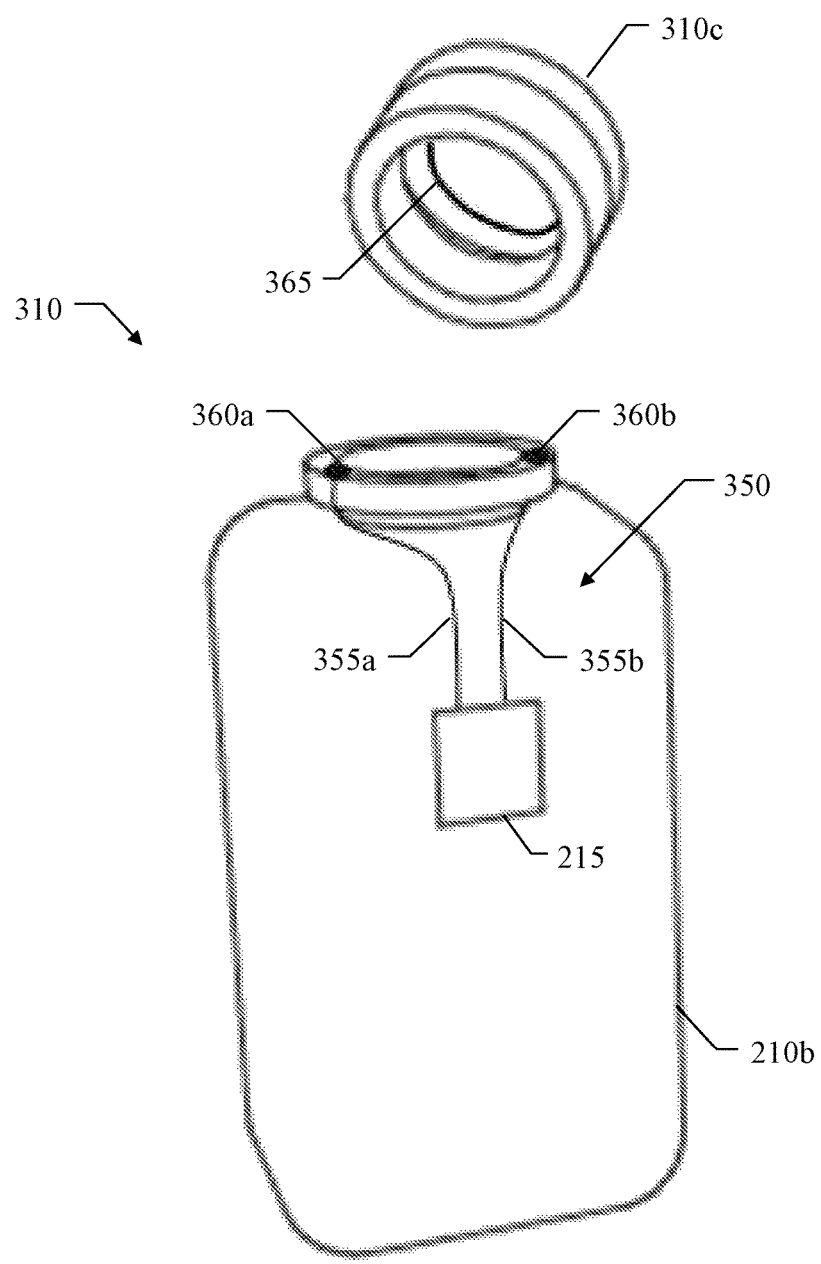
FIG. 3 shows another example of the package that may be used to practice the solution according to an embodiment of the present disclosure.

With reference now to FIG. 3, another example is shown of the package that may be used to practice the solution according to an embodiment of the present disclosure.

The package has a structure that differs from the one described above in that one of the sensors of the package is implemented by another (opening/closing) electric circuit 350 that is now used to detect any opening and any closing of the container 310. In this case, the electric circuit 350 comprises the following components. Two (electrically) conductive wires 355a and 355b (embedded in the bottle 210b) connect the same terminals as above of the control unit in the electronic circuit 215 to corresponding electric contacts 360a and 360b that are exposed on an external surface of bottle 210b, which faces the cup 310c when applied thereto (for example, a free border of its mouth); an (electrically) conductive ring 365 is exposed on an internal surface of the cup 310c, which faces the electric contacts 360a and 360b when the cup 310c is applied to the bottle 210b (for example, within a base thereof).

When the container 310 is closed (not shown in the figure), with the cup 310c applied to the bottle 210b, the conductive ring 365 touches the electric contacts 360a and 360b, so that the electric circuit 350 is a short circuit. Conversely, when the container 210 is open (as shown in the figure), with the cup 310c removed from the bottle 210b, the electric contacts 360a and 360b are floating, so that the electric circuit 350 is an open circuit. As a result, the control unit in the electronic circuit 215 may detect any opening and any closing of the container 310 by monitoring a resistance of the electric circuit 350 (when it passes from zero to infinite ideally and vice-versa, respectively).

Figure 4A:
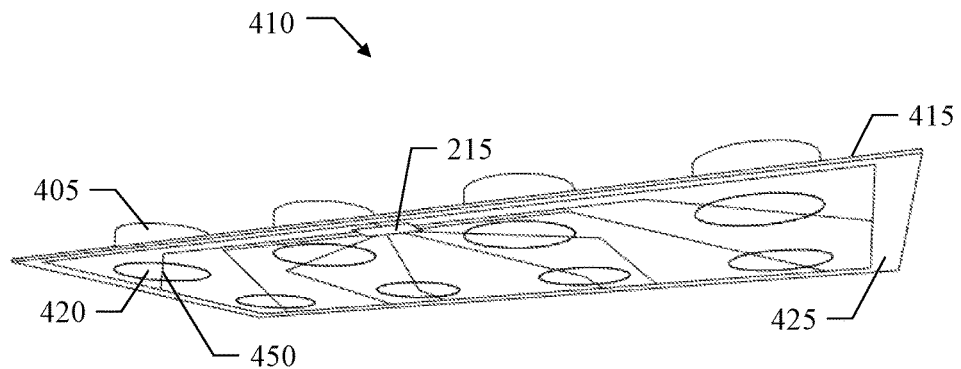
FIG. 4A-FIG. 4B show another example of the package that may be used to practice the solution according to an embodiment of the present disclosure in different operative conditions.
Figure 4B:
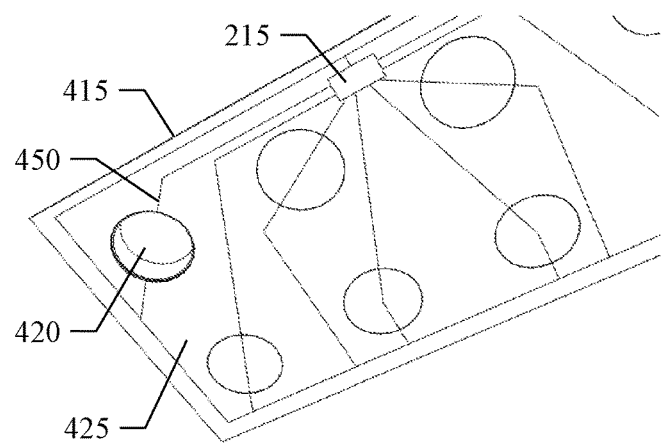

With reference now to FIG. 4A-FIG. 4B, another example is shown of the package that may be used to practice the solution according to an embodiment of the present disclosure in different operative conditions.

Starting from FIG. 4A, the product comprises a plurality of (product) doses 405 (for example, pills) that are packaged individually in corresponding compartments of the package; for example, the package comprises a (push-through) blister 410 having a base 415 with cavities defining the compartments 420 for the product doses 405 (only one numbered in the figure) that are closed by a frangible foil 425. The electronic circuit 215 is embedded in the blister 410 (for example, within its base 415). The package comprises further sensors for detecting any consumptions of the product doses 405. These sensors are implemented by a (consumption) electric circuit 450 for each compartment 420 (only one numbered in the figure), which electric circuit 450 is used to detect a breaking of the compartment 420. Particularly, the electric circuit 450 is formed by a thin (electrically) conductive wire that crosses the (closed) compartment 420 along the frangible foil 425, with an end thereof that is connected to a terminal of the control unit in the electronic circuit 215 corresponding to the compartment 420; the conductive wires of all the compartments 420 have another end thereof that is connected to a (common) reference terminal of the control unit in the electronic circuit 215, so as to create corresponding short circuits.

Passing to FIG. 4B, the consumption of each product dose involves the breaking of the corresponding compartments 420 (only one shown in the figure) for extracting the product dose from it. Particularly, the base 415 is pushed in correspondence to the compartment 420 to cause it to collapse, with the product dose that then breaks the corresponding portion of the frangible foil 425 so as to be dispensed. During this operation, the conductive wire of the corresponding electric circuit 450 is broken so as to become an open circuit. As a result, the control unit in the electronic circuit 215 may detect the consumption of each product dose by monitoring a resistance of the corresponding electric circuit 450 (when it passes from zero to infinite ideally).

Figure 5:
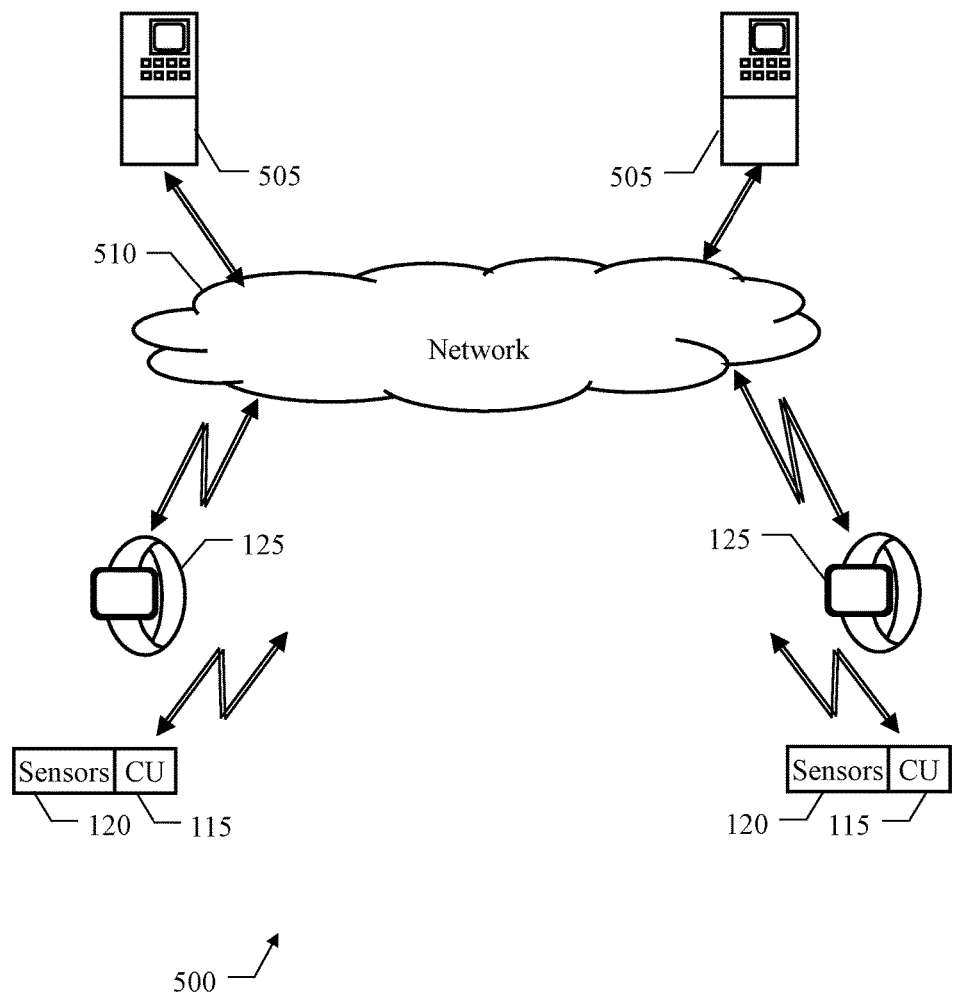
FIG. 5 shows a schematic block diagram of a computing system wherein the solution according to an embodiment of the present disclosure may be applied.

With reference now to FIG. 5, a schematic block diagram is shown of a computing system 500 wherein the solution according to an embodiment of the present disclosure may be applied.

The computing system 500 comprises corresponding computing devices embedded in the packages of the products whose usage should be controlled, each one formed by the control unit 115 and its sensors 120 (for example, supplied by a button battery). Moreover, the computing system 500 comprises the smart portable devices 125 of one or more users of these products (for example, supplied by rechargeable batteries). In some embodiments, the smart portable devices 125 are wearable (for example, smartwatches) so as to help ensure that they are available when their users handle the products. The smart portable devices 125 may communicate in wireless mode with the control units 115 (for example, via the NFC technology). The computing system 500 further comprises one or more remote computing machines 505 (for example, servers of manufacturers of the products); the smart portable devices 125 may communicate with the remote computing machines 505 via a telecommunication network 510 (for example, based on the Internet).

Figure 8:
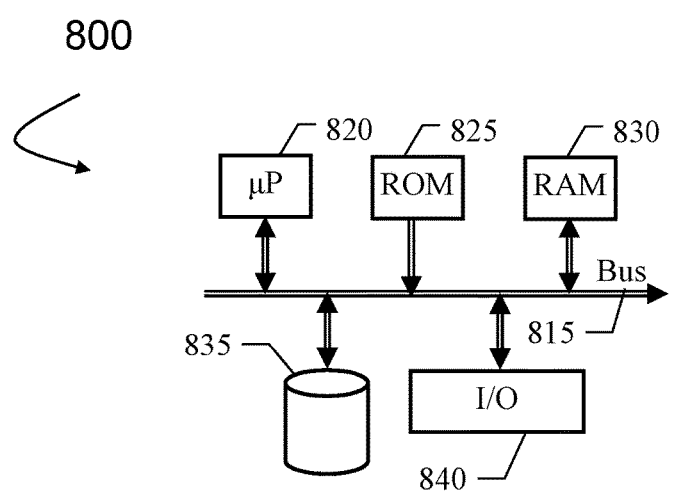
FIG. 8 shows a high level block diagram of a computing device according to an embodiment of the present disclosure.

Each of the above-described computing components (i.e., control units 115, smart portable devices 125 and remote computing machines 505) can be implemented using a computing device, such as the example computing device 800 shown in FIG. 8. The computing device 800 comprises several units that are connected among them, for example, through a bus structure 815 with one or more levels. Particularly, one or more microprocessors (μP) 820 control operation of the computing component; a non-volatile memory (ROM) 825 stores basic code for a bootstrap of the computing component and a volatile memory (RAM) 830 is used as a working memory by the microprocessors 820. The computing component is provided with a mass-memory 835 for storing programs and data (for example, flash memories for the control units 115 and the smart portable devices 125 and storage devices of corresponding server farms for the remote computing machines 505). The mass-memory 835 and/or the RAM 830 can store instructions for execution by the microprocessor 820 to perform the functions discussed herein.

Moreover, the computing component comprises a number of controllers for peripheral (or Input/Output, I/O) units 840. For example, the peripheral units of each the control unit 115 comprise its sensors 120 and an NFC apparatus; the peripheral units of each smart computing device 125 comprise an NFC apparatus, a wireless network interface card (for example, of the Wi-Fi type), a mobile telephone transceiver, a display (for example, a touch-screen), a speaker; the peripheral units of each remote computing machine 505 comprise a network interface card, a drive for reading/writing removable storage units such as optical disks, like DVDs (implemented by a console of its server farm).

Figure 6:
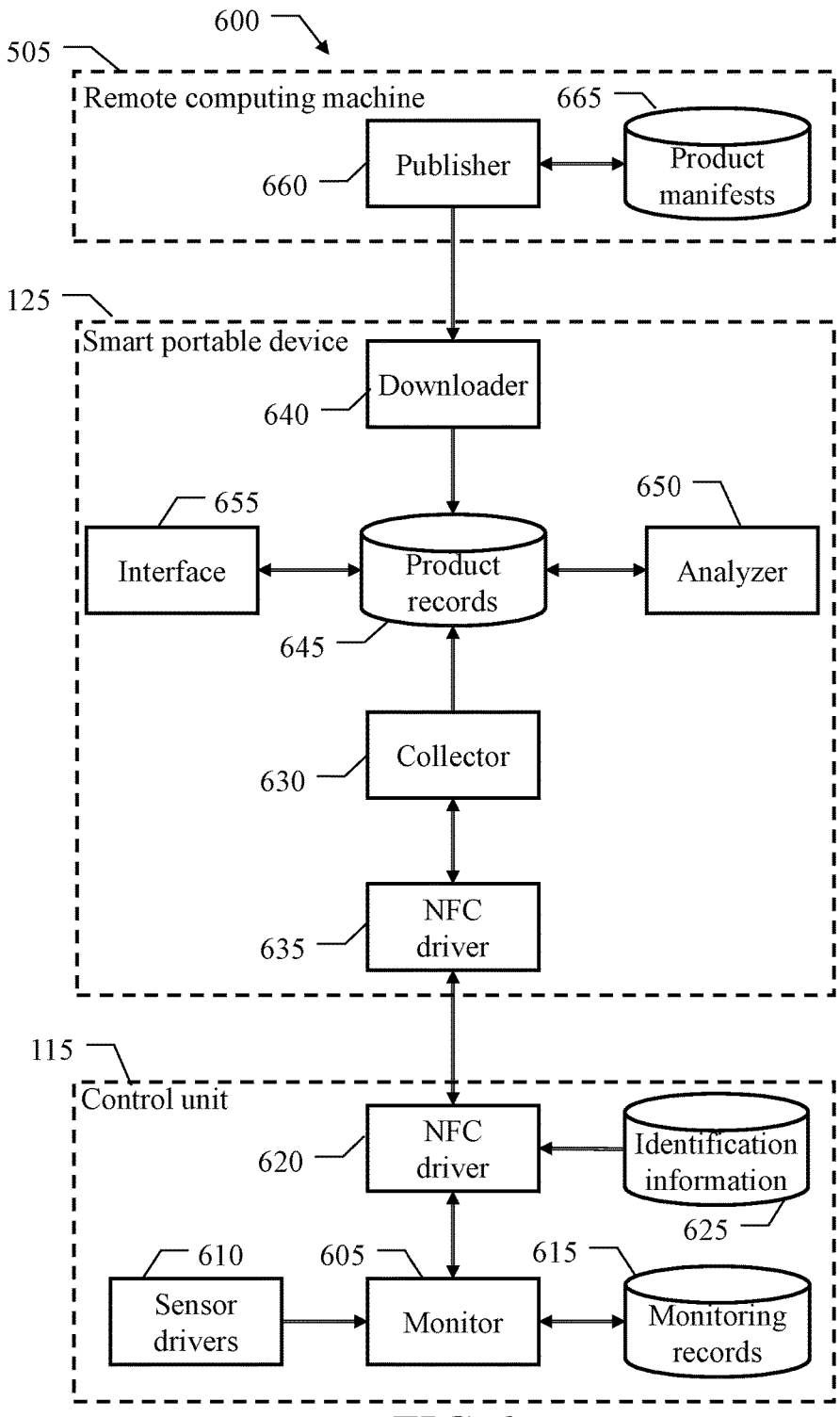
FIG. 6 is a high level block diagram of components that may be used to implement the solution according to an embodiment of the present disclosure.

With reference now to FIG. 6, example components of one embodiment of a system 600 are shown that may be used to implement the solution according to an embodiment of the present disclosure. Some or all of the components depicted in FIG. 6 can be implemented by a processor executing instructions stored in a memory.

For example, software components or instructions are typically stored in the mass memory and loaded (at least partially) into the working memory of each control unit 115, smart computing device 125 and remote computing machine 505 when the programs are running, together with an operating system and other application programs (not shown in the figure). The programs are initially installed into the mass memory, for example, from removable storage units or from the telecommunication network. In this respect, each program may be a module, segment or portion of code, which comprises one or more executable instructions for implementing the specified logical function.

Particularly, each control unit 115 (only one shown in the figure) comprises the following components in the example shown in FIG. 6. A monitor 605 is used to monitor its sensors (not shown in the figure); for this purpose, the monitor 605 exploits corresponding sensor drivers 610. The monitor 605 accesses (in read/write mode) a monitoring log 615, which stores monitoring records of all the sensors. Each monitoring record comprises a time stamp and corresponding monitoring data; for example, the monitoring data is a type/value pair indicating an environment parameter and its value (such as illumination, temperature), the first opening of the container and a null value, the opening/closing of the container and a corresponding flag, the product doses and a remaining number thereof. Moreover, the monitor 605 interacts with an NFC driver 620 of its NFC apparatus. The NFC driver 620 accesses (in read mode) an identification structure 625 that stores identification information of the product (for example, in an RFID tag); the identification information comprises a product identifier (for example, indicating the product and its production batch) and a nominal value of its expiration date (nominal expiration date).

Each smart portable device 125 (only one shown in the figure) comprises the following components in the example shown in FIG. 6. A collector 630 is used to collect the package information of the products of its user. For this purpose, the collector 630 exploits an NFC driver 635 of its NFC apparatus for communicating with the NFC driver 620 of each control unit 115 (within its transmission range). A downloader 640 is used to download product manifests of the products of the user from the remote computing machines 505. Particularly, each product manifest comprises a product identifier and corresponding manifest data; for example, the manifest data is an expiration rule, a description or an indication of an external event for the corresponding product. The expiration rule indicates how to calculate an effective value of the expiration date (effective expiration date) according to the corresponding nominal expiration date and effecting events; for example, the expiration rule may indicate that the product has to be used within a certain period from the (first) opening of its container, how any opening period of the container affects its duration, how the values of the environment parameters above/below corresponding thresholds affect its duration. The description comprises information useful for the usage of product (for example, its name, instructions comprising therapeutic indications, dosages, side effects and the like). The external event is an event that affects the usage of the product independently of a handling of its package (for example, the prohibition of use due to the withdrawn from the market of its production batch, any newly discovered side-effects such as for specific types of users like children, pregnant women). The collector 630 and the downloader 640 access (in write mode) a product repository 645, which stores a product record for each product of the user; the product record comprises the product identifier, the description, the nominal expiration date, the expiration rule, the effective expiration date, any external events and all the monitoring records of the product. An analyzer 650 is used to control the usage of the products of the user. The analyzer 655 accesses (in read/write mode) the product repository 645. An interface 655 is used to view and edit the product repository 645 manually. For example, the user may search his/her products by selected criteria (such as name, category, therapeutic indication, keywords) and then browse their descriptions (thereby facilitating the finding of the products for specific needs, the verification of the products that are available to avoid their buying uselessly), the user may delete product records of products that have been binned (when the event has not been detected by the smart portable device).

Each remote computing machine 505 (only one shown in the figure) comprises the following components in the example shown in FIG. 6. A publisher 660 is used to publish the product manifests (comprising the expiration rules, descriptions or external events) of one or more products (for example, implementing a service that is offered by a corresponding manufacturer for all its products). The publisher 660 accesses (in write mode) a manifest repository 665, which stores the product manifests of these products (at the level of single products, production batches or product types) in association with corresponding timestamps of their publication.

Figure 7A:
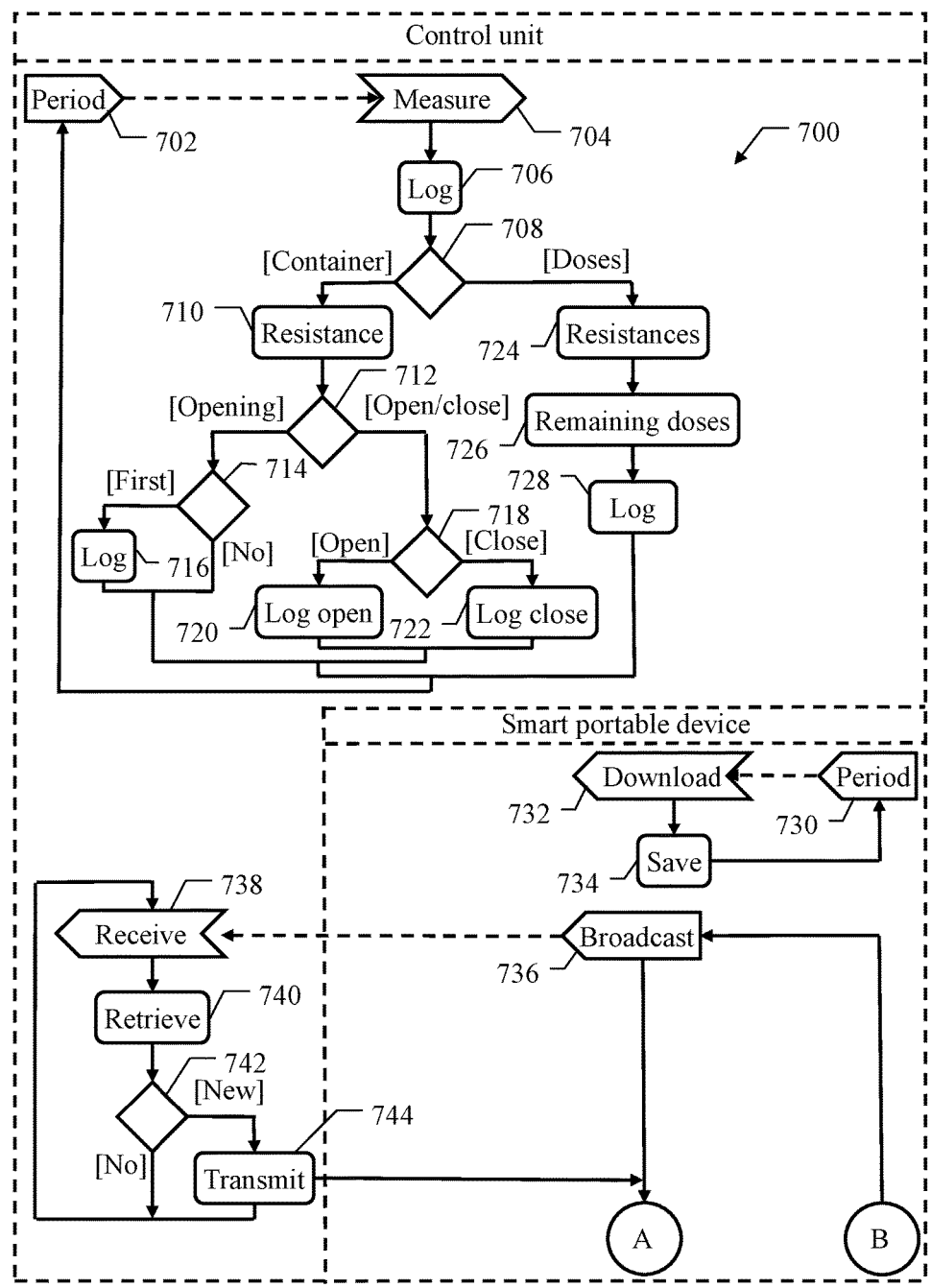
FIG. 7A-FIG. 7B show a flow chart of an example method relating to an implementation of the solution according to an embodiment of the present disclosure.
Figure 7B:
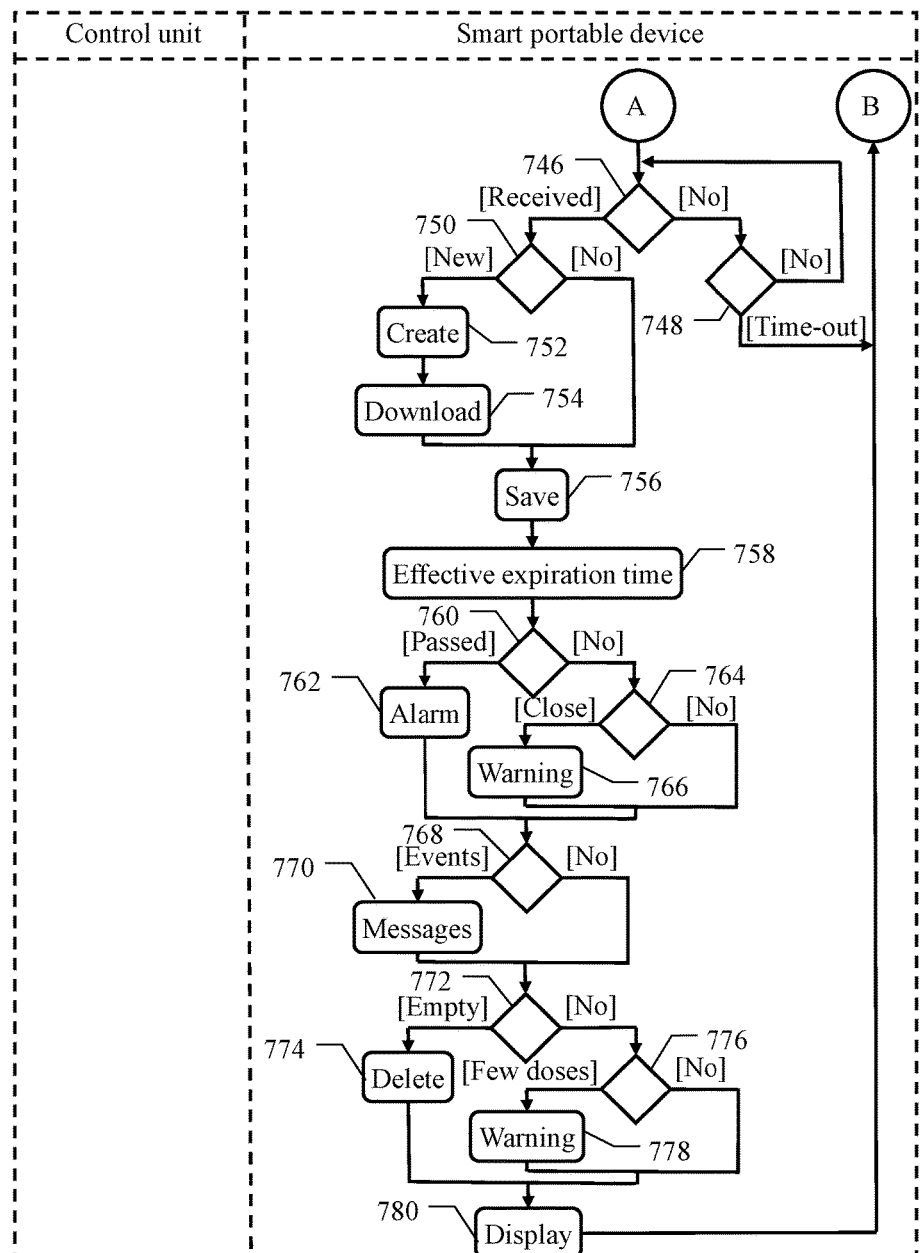

With reference now to FIG. 7A-FIG. 7B, an activity diagram is shown describing the flow of activities relating to an implementation of the solution according to an embodiment of the present disclosure.

Particularly, the diagram represents an exemplary process that may be used to control the usage of the products of a generic user with a method 700. In this respect, each block may correspond to one or more executable instructions for implementing the specified logical function on the corresponding control units or on the smart portable device of the user.

The process passes from block 702 to block 704 in the swim-lane of the control unit of each product (only one shown in the figure) every time a relatively short period expires (for example, 1-2 s); in response thereto, the monitor measures the environment parameters by interrogating the corresponding sensors. The monitor at block 706 then stores the results of these measurements into the monitoring log (by adding a monitoring record with the current time stamp, the type of the corresponding environment parameter and its value for each measurement).

Continuing to block 708, the flow of activity branches according to the type of package of the product. Particularly, if the product is contained as a whole in a container the monitor at block 710 measures the resistance of the corresponding (opening or opening/closing) electric circuit. The flow of activity further branches at block 712 according to the type of the electric circuit. Particularly, if the container is associated with the opening electric circuit (for detecting its opening only) the monitor at block 714 compares the resistance of the (opening) electric circuit with a discrimination threshold between the short circuit and the open circuit (for example, 100-500Ω). If the resistance of the electric circuit is (possibly strictly) higher than the discrimination threshold (meaning that it is an open circuit and then the container is open) and this is the first time that the opening of the container is detected (as indicated in the monitoring log) the process descends into block 716; at this point, the monitor stores an indication of the first opening of the container into the monitoring log (by adding a monitoring record with the current time stamp, the type indicating the first opening of the container and the null value). The flow of activity then returns to the block 702 for repeating the same operations periodically; the same point is also reached directly from the block 714 if the resistance of the electric circuit is (possibly strictly) lower than the discrimination threshold (meaning that it is a short circuit and then the container is closed) or this is not the first time that the opening of the container is detected.

Returning to the block 712, if the container is associated with the opening/closing electric circuit (for detecting both its opening and its closing) the monitor at block 718 compares the resistance of the (opening/closing) electric circuit with the discrimination threshold as above. If the resistance of the electric circuit is (possibly strictly) higher than the discrimination threshold (meaning that it is an open circuit and then the container is open) the monitor at block 720 stores an indication of the opening of the container into the monitoring log (by adding a monitoring record with the current time stamp, the type indicating the opening/closing of the container and the corresponding flag that is asserted). Conversely, if the resistance of the electric circuit is (possibly strictly) lower than the discrimination threshold (meaning that it is a short circuit and then the container is closed) the monitor at block 722 stores an indication of the closing of the container into the monitoring log (by adding a monitoring record with the current time stamp, the type indicating the opening/closing of the container and the corresponding flag that is deasserted). In both cases, the flow of activity returns to the block 702 (from the block 720 or from the block 722) for repeating the same operations periodically.

Referring back to the block 708, if the product comprises product doses that are packaged individually in different compartments, the monitor at block 724 measures the resistances of the corresponding (consumption) electric circuits. The monitor at block 726 determines the remaining number of the product doses as defined by the electric circuits whose resistance is (possibly strictly) lower than the discrimination threshold (meaning that they are short circuits and then the corresponding compartments are not broken). The monitor at block 728 stores the remaining number of the product doses into the monitoring log (by adding a monitoring record with the current time stamp, the type indicating the product doses and their remaining number). The flow of activity then returns to the block 702 for repeating the same operations periodically.

Moving to the swim-lane of the smart portable device of the user, the process passes from block 730 to block 732 every time a relatively long period expires (for example, 1-2 days); in response thereto, the downloader retrieves the product identifiers of its products (from the product repository) and downloads any (new) product manifests relating thereto from the corresponding remote computing machines (i.e., published after a last downloading); particularly, the product manifests comprise any expiration rules and descriptions that have been changed or the indication of any external events that have occurred since the last downloading. The downloader at block 734 then saves the downloaded product manifests into the product repository (by replacing any changed expiration rules or descriptions and adding the indication of any external events into the records of the corresponding products).

In a completely independent way, the collector at block 736 broadcasts the interrogation signal (through the NFC driver); the interrogation signal (for example, a reset command) comprises a unique identifier of the smart computing device. The NFC driver of each (current) product within the transmission range of the interrogation signal from the smart portable device receives it at block 738 in the swim-lane of its control unit (the same as above in the example at issue). In response thereto, the collector at block 740 retrieves any (new) package information of the product. If this the first interrogation signal that is received from the smart portable device (as indicated by its identifier), the new package information comprises the nominal expiration date of the product (retrieved from the identification structure) and all the monitoring records in the monitoring log (indicating the package events and/or the remaining number of the product doses); conversely, the new package information comprises any monitoring records that have been saved in the monitoring log since a last interrogation signal from the same smart computing device. The flow of activity then branches at block 742 according to a result of this operation. Particularly, if any new package information has been retrieved, the collector at block 744 transmits this new package information to the smart computing device in association with the product identifier, extracted from the identification structure (for example, in a corresponding ATR response signal). The process then returns to the block 738 waiting from a next interrogation signal; the same point is also reached directly from the block 742 if no new package information has been retrieved. In this way, the package information is transmitted to the smart computing device only when it is necessary (thereby reducing a power consumption of the control unit); at the same time, the package information is transmitted to the smart computing device when it has been changed (thereby avoiding any loss thereof).

Returning to the swim-lane of the smart computing device, meanwhile the process passes from the block 736 to block 746, wherein the collector verifies (through the NFC driver) whether any (new) package information has been received (in response to the interrogation signal). If not, the collector at block 748 verifies whether a predefined time-out from the broadcasting of the interrogation signal has expired (for example, 1-2 s). If not, the process returns to the block 746 in a waiting loop; conversely, as soon as the time-out has expired the process returns to the block 736 for repeating the same operations periodically.

Referring back to the block 746, as soon as any package information has been received the flow of activity descends into block 750; at this point, the collector verifies whether the package information relates to a new product for the smart computing device (i.e., the associated product identifier is not present in the product repository). If so, the collector at block 752 creates a corresponding (new) product record into the product repository; the product record is initialized with the product identifier and the nominal expiration date of the product (in this case received in the package information as described above). Continuing to block 754, the collector instructs the downloader to download all the product manifests associated with the product identifier of the product from the corresponding remote computing machines (so as to obtain its expiration rule and the indication of all the external events relating thereto) and to save them into the product repository (by adding them to the corresponding product record). In this way, the product repository self-adapts automatically according to the products that are acquired by the user. The process then continues to block 756; the same point is also reached directly from the block 750 if the package information does not relate to a new product for the smart computing device (and then the corresponding product record is already present in the product repository). In both cases, the collector saves the package information that has been received into the product repository (by adding the corresponding monitoring records).

Continuing to block 758, the analyzer calculates the effective expiration date of the product and saves it into the corresponding product record of the product repository (replacing any previous value thereof). For this purpose, the analyzer retrieves the expiration rule and evaluates it according to the nominal expiration date and to the monitoring events (from the corresponding product record in the product repository). For example, the analyzer may verify whether the container has been opened (by looking for any monitoring record of the type indicating the first opening or any monitoring record of the type indicating the opening/closing with the corresponding flag that is asserted); the analyzer may initialize the effective expiration date to a predefined period after the first opening of the container (as indicated by the timestamp of the oldest one of these monitoring records, if any) or to the nominal expiration date otherwise. The analyzer may then reduce the effective expiration date according to the package events. For example, the analyzer may calculate an (opening) period wherein the container remained open according to the timestamps of the monitoring records of the type indicating the opening/closing and it may calculate a (degradation) period wherein the product remained exposed to values of each environment parameter (possibly strictly) lower/higher than corresponding (reduction) thresholds according to the timestamps of the monitoring records of the type indicating the environmental parameter; the analyzer may then reduce the time remaining to reach the effective expiration date according to a percentage of these periods. Moreover, the analyzer may verify whether any (expiration) conditions occurred wherein the product remained exposed to values of each environment parameter (possibly strictly) lower/higher than corresponding (expiration) thresholds; the analyzer may then set the product as expired (for example, by resetting the effective expiration date to a null value) in response to the detection of any of these conditions.

The flow of activity then branches at block 760 according to the effective expiration date. If the product has expired (i.e., the effective expiration date has passed or it has the null value) the analyzer at block 762 creates a corresponding alarm message (for example, to inform the user that the product should not be used any longer). Conversely, the flow of activity further branches at block 764 according to the (remaining) time that remains to reach the effective expiration date. If the remaining time is (possibly strictly) lower than a (warning) threshold (for example, 1-4 weeks), the analyzer at block 766 creates a corresponding warning message (for example, to inform the user that the product is going to expire shortly). The process then descends into block 768 from the block 762, from the block 766 or directly from the block 764 if the remaining time is (possibly strictly) higher than the threshold.

At this point, the analyzer verifies whether the indication of any external events is present in the corresponding product record. If so, the analyzer at block 770 creates a corresponding alarm/warning message for each external event; for example, the analyzer creates an alarm message when the external event indicates that the product has been withdrawn from the market (for example, to inform the user that the product should not be used) or it creates a warning message when the external event indicates a newly discovered side-effect, such as for specific type of users (for example, to inform them that the product is not recommended). The process then descends into block 772; the same point is also reached directly from the block 768 if the indication of no external event is present in the corresponding product record.

At this point, the analyzer verifies the remaining number of the product doses (as indicated by the last monitoring record of the corresponding type, if any). If the remaining number of the product doses is zero (meaning that the package is empty and then should be binned), the analyzer at block 774 deletes the corresponding product record from the product repository. In this way, the product repository self-adapts automatically according to the consumptions of the products. Referring back to the block 772, if the remaining number of the product doses is different from zero the process descends into block 776, wherein the analyzer compares the remaining number of the product doses with a (warning) threshold (for example, 2-4). If the remaining number of the product doses is (possibly strictly) lower than the threshold, the analyzer at block 778 creates a corresponding warning message (for example, to inform the user that the product is going to finish shortly). The process then descends into block 780; the same point is also reached directly from the block 776 if the remaining number of the product doses is (possibly strictly) higher than the threshold or if it is not available.

At this point, the analyzer displays the name of the product (extracted from the corresponding product record in the product repository) and any warning/alarm messages that may have been created for the product as described above to inform the user accordingly. At the same time, the user may request the interface (by selecting a corresponding command) to display the description of the product (retrieved from the corresponding product record in the product repository). In this way, the user may find any information useful for the usage of the product; this result is achieved in a very simple way, without any need of searching the product (in the product repository) since it is already selected automatically. The process then returns to the block 736 for repeating the same operations continually.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling usage of a perishable product. However, the perishable product may be of any type (for example, drug, food, beverage, medicament).

In an embodiment, the method comprises the following steps under the control of a control unit associated with a package of the perishable product. However, the control unit may be of any type (see below) and it may be associated with the package in any way (for example, embedded, attached, built in); moreover, the package may be of any type (for example, a container of a bulk substance or unpacked product doses, with compartments for packaging product doses individually).

In an embodiment, the method comprises storing an indication of one or more package events that may affect a duration of the perishable product. However, the package events may be of any type (for example, first opening, any opening and closing, any values of any environment parameters or any combination thereof); moreover, the package events may be stored in any way (for example, by storing all the events that may potentially affect the duration of the product or only the events that are actually relevant) in any memory structure (for example, embedded in the control unit or external thereto).

In an embodiment, the package events are sensed by one or more sensors associated with the package. However, the sensors may be in any number and of any type (for example, each for detecting/monitoring one or more of the above-mentioned package events) and they may be associated with the package in any way (either the same or different with respect to the control unit).

In an embodiment, the method comprises receiving an interrogation signal from a smart portable device of a user of the perishable product. However, any interrogation signal may be received from any smart portable device (see below).

In an embodiment, the method comprises retrieving package information that is stored in association with the control unit in response to the interrogation signal (with the package information that comprises the indication of at least part of the package events). However, the package information may comprise the indication of any number of the package events (for example, only the most recent ones or all of them) with any additional information, down to none (for example, the nominal expiration date, the product identifier).

In an embodiment, the method comprises transmitting the package information to the smart portable device (for use by the smart portable device to control the usage of the perishable product according thereto). However, the package information may be transmitted to the smart portable device in any way (either the same or different with respect to the receiving of the interrogation signal); moreover, the package information may be used by the smart portable device to control the usage of the perishable product in any way (see below).

In an embodiment, the method comprises transmitting the package information to the smart portable device for use by the smart portable device to calculate an effective expiration date of the perishable product according to an expiration rule based on the package information and to control the usage of the perishable product according to the effective expiration date. However, the effective expiration date may be calculated in any way and it may be used to control the usage of the perishable product in any way (see below).

In an embodiment, the method comprises retrieving the package information comprising a nominal expiration date of the perishable product. However, the nominal expiration date may be of any type (for example, day, time) and it may be retrieved in any way (for example, from an RFID tag, a non-volatile memory).

In an embodiment, the method comprises retrieving the package information comprising a product identifier of the perishable product. However, the product identifier may be of any type (for example, identifying the product, a production batch thereof, its type) and it may be retrieved in any way (either the same or different with respect to the nominal expiration date).

In an embodiment, the method comprises transmitting the package information to the smart portable device for use by the smart portable device to receive one or more product manifests corresponding to the product identifier from at least one remote computing machine via a telecommunication network (for controlling the usage of the perishable product according to the product manifests). However, the product manifests may be of any type and they may be used to control the usage of the perishable product in any way (see below).

In an embodiment, the perishable product comprises a plurality of product doses that are packaged individually in corresponding compartments of the package. However, the product doses may be in any number and of any type (for example, pills, tablets, tea bags, Band-Aids) and they may be packaged in any type of compartments (for example, cavities of blisters, bags).

In an embodiment, the method comprises storing an indication of a remaining number of the product doses. However, the remaining number of the product doses may be indicated in any way (for example, by its actual number, by the consumption of each product dose) and it may be stored in any way (either the same or different with respect to the package events).

In an embodiment, the remaining number of the product doses is based on any breaking of the compartments that is sensed by one or more further sensors associated with the package. However, the breaking of the compartments may be detected by any number and type of further sensors (for example, with an electric circuit for each compartment or with a single electric circuit comprising corresponding equal resistors connected in series to the conductive wires of the compartments that are then all connected in parallel, so that a total resistance of the whole electric circuit indicates the remaining number of the product doses since only the corresponding resistors contribute to the total resistance); moreover, the further sensors may be associated with the package in any way (either the same or different with respect to the sensors of the package events).

In an embodiment, the method comprises retrieving the package information comprising the indication of the remaining number of the products doses. However, the remaining number of the products doses may be retrieved in any way (either the same or different with respect to the package events).

In an embodiment said step of storing an indication of any package events comprises detecting a first opening time of the package. However, the first opening may relate to any type of package (for example, a container of any bulk substance like liquid, cream, gel, solution or of any unpackaged product like pills, tablets, a sealed bag of the container, a box of the product) and it may be detected with any sensor (for example, based on an electric circuit that is broken or with the same sensor used to detect the opening/closing of the package).

In an embodiment said step of storing an indication of any package events comprises detecting one or more opening times of the package and one or more closing times of the package. However, the opening and closing may relate to any type of package (either the same or different with respect to the one for the detection of the first opening) and they may be detected with any sensor (for example, based on an electric circuit that is opened/closed, a Reed).

In an embodiment said step of storing an indication of any package events comprises monitoring one or more environment parameters relating to the package. However, the environment parameters may be in any number and of any type (for example, temperature, illumination in general or of specific wavelengths only such as UV rays, moisture, pressure, pH, agitation, melting).

An embodiment provides a method for controlling usage of one or more perishable products. However, the perishable products may be in any number and of any type (see above).

In an embodiment, the method comprises the following steps under the control of a smart portable device of a user of the perishable products. However, the smart portable device may be of any type (see below) and it may be of any user for either personal or collective interest (for example, a consumer of the products like a patient or an operator in change of administering the products like a healthcare assistant).

In an embodiment, the method comprises broadcasting an interrogation signal repeatedly (with the interrogation signal having a transmission range around the smart portable device). However, the interrogation signal may be of any type and with any transmission range (for example, RFID, NFC, Bluetooth), and it may be broadcast with any timing.

In an embodiment, the method comprises receiving (from a control unit associated with a package of each current one of the perishable products that is within the transmission range from the smart portable device) package information of the current perishable product in response to the interrogation signal (with the package information comprising an indication of one or more package events that may affect a duration of the current perishable product that are sensed by one or more sensors associated with the package). However, the package information may be received in any way (either the same or different with respect to the broadcasting of the interrogation signal) and they may be of any type (see above).

In an embodiment, the method comprises controlling the usage of each current perishable product according to the package information thereof. However, the usage of the current perishable product may be controlled in any way (for example, calculating the effective expiration date, monitoring the remaining number of product doses, simply verifying that no package events made the perishable product unsuitable for use or any combination thereof) and by any interaction with the user (for example, displaying a message indicating the status of the current perishable product, by alerting and/or warning the user with visual, acoustic and/or vibration messages).

In an embodiment, the method comprises calculating an effective expiration date of each current perishable product according to an expiration rule based on the package information thereof. However, the effective expiration date may be of any type (for example, day, time), requiring or simply suggesting the use of the perishable product before it for any reason (for example, because the perishable product may become of poor quality, ineffective, unsafe, dangerous); moreover, the effective expiration date may be calculated according to any expiration rule (for example, with linear, non-linear and/or step functions) based on any package events (for example, the first opening of the package, the opening periods wherein the container remained open, the reaching of thresholds by the values of the environment parameters or any combination thereof).

In an embodiment, the method comprises controlling the usage of each current perishable product according to the effective expiration date thereof. However, the usage of the perishable product may be controlled according to the effective expiration date in any way (for example, with an alarm message after the effective expiration date or with different alarm messages according to the time lapsed from it, with a warning message when the remaining time to the effective expiration date reaches any threshold, with different warning messages according to the remaining time).

In an embodiment, the method comprises receiving the package information comprising a nominal expiration date of each current perishable product. However, the nominal expiration date may be of any type (see above); in any case, the possibility is not excluded of retrieving the nominal expiration date by the smart portable device directly (for example, from the remote computing machines through the product identifier).

In an embodiment, the method comprises receiving the package information comprising a product identifier of each current perishable product. However, the product identifier may be of any type (see above).

In an embodiment, the method comprises receiving one or more product manifests corresponding to the product identifier of each current perishable product from at least one remote computing machine via a telecommunication network. However, the product manifests may be in any number and of any type (for example, comprising the expiration rule, the description, the external events or any combination thereof); moreover, the product manifests may be received in any way (for example, in pull mode or in push mode) from any number and type of remote computing machines through any communication network (see below) managed by any entity (for example, manufacturers of the products, public authorities, consumer associations); in any case, the possibility is not excluded of receiving the same information or at least part thereof (such as the expiration rule) from the corresponding control units directly.

In an embodiment, the method comprises controlling the usage of each current perishable product according to the product manifests thereof. However, the usage of the current perishable product may be controlled according to the product manifests in any way (for example, defining the calculation of the effecting expiration date, prohibiting the usage of the perishable product, suggesting its non-use).

In an embodiment, said step of receiving one or more product manifests comprises receiving the expiration rule corresponding to the product identifier of each current perishable product. However, the expiration rule may be received in any way (for example, only when the current perishable product is new for the smart portable device).

In an embodiment, said step of receiving one or more product manifests comprises receiving a description corresponding to the product identifier of each current perishable product. However, the description may be of any type (for example, name, instructions, suggestions, advertisements).

In an embodiment, said step of receiving one or more product manifests comprises receiving an indication of one or more external events corresponding to the product identifier of each current perishable product (the external events affecting the usage of the current perishable product independently of a handling of the package thereof). However, the external events may be in any number and of any type (for example, indicating prohibition of use, side effects, contraindications, benefits, interactions with other products).

In an embodiment, the method comprises the following steps for each current perishable product comprising a plurality of product doses packaged individually in corresponding compartments of the package. However, the product doses may be of any type and they may be packaged in any type of compartments (see above).

In an embodiment, in this case the method comprises receiving the package information comprising an indication of a remaining number of the product doses of the current perishable product. However, the remaining number of the product doses may be indicated in any way (see above).

In an embodiment, in this case the method comprises controlling the usage of the current perishable product according to the remaining number of the product doses thereof. However, the usage of the perishable product may be controlled according to the remaining number of the product doses in any way (for example, with a warning message when the remaining number of the product doses reaches a threshold, with different warning messages according to the remaining number of the product doses, with a warning message when the package is empty).

In an embodiment, the method comprises maintaining a product repository according to the package information of each current perishable product. However, the product repository may contain any information (for example, product identifier, description, nominal expiration date, expiration rule, effective expiration date, external events, monitoring records or any combination thereof) and it may be used for any purpose (for example, accessed locally for displaying information or performing searches by the user, transmitted remotely (previous authorization of the user) to a computer, such as of a doctor, for verifying conservation and consumption of the perishable products, transmitted remotely to a computer, for example, of an hospital, for tracking conservation and availability of the perishable products).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides computer programs configured for causing corresponding computing systems (i.e., the control unit and the smart portable device) to perform the above-mentioned methods. An embodiment provides computer program products comprising a computer readable storage medium having program instructions embodied therewith, the program instructions executable by the corresponding computing systems to cause the computing systems to perform the same methods. However, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the steps of the above-mentioned methods. An embodiment provides a system comprising a circuitry (i.e., any hardware suitably configured, for example, by software) for performing each step of the same methods. Particularly, an embodiment provides a control unit for controlling usage of a perishable product as mentioned above. An embodiment provides a package of a perishable product comprising this control unit. An embodiment provides a smart portable device for controlling usage of one or more perishable products as mentioned above. However, the system may comprise any number of control units, packages, smart portable devices, each control unit may be of any type (for example, an MCU, a microprocessor), each package may be of any type (see above) and each smart portable device may be of any type (for example, a smart-watch, a wrist-band, a smart-phone).

Generally, similar considerations apply if the system, the control unit, the package and the smart computing device each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of features described above may be the following: claim 2 with claim 1, claim 3 with claim 2, claim 4 with any claim from 1 to 3, claim 5 with any claim from 1 to 4, claim 6 with any claim from 1 to 5, claim 8 with claim 7, claim 9 with claim 8, claim 10 with any claim from 7 to 9, claim 11 with claim 8, claim 12 with claim 10, claim 13 with any claim from 7 to 12, claim 14 with any claim from 7 to 13, claim 15 with instructions for performing the method of any claim from 1 to 6, claim 16 with instructions for performing the method of any claim from 7 to 14, claim 17 with means (or a circuitry) for performing each step of any claim from 1 to 6 and claim 18 with means (or a circuitry) for performing each step of any claim from 7 to 14.

What is claimed is:

1. A method for controlling usage of one or more perishable products, the method comprising, under the control of a smart portable device of a user of the perishable products:
broadcasting an interrogation signal repeatedly, the interrogation signal having a transmission range around the smart portable device;
receiving, from a control unit associated with a package of each current one of the perishable products being within the transmission range from the smart portable device, package information of the current perishable product in response to the interrogation signal, the package information comprising an indication of one or more package events that may affect a duration of the current perishable product being sensed by one or more sensors associated with the package, the package information comprising a product identifier of each current perishable product;
receiving an expiration rule corresponding to the product identifier of each current perishable product, the expiration rule received from at least one remote computing machine via a telecommunication network;
calculating an effective expiration date of each current perishable product according to the expiration rule based on the package information thereof; and
controlling the usage of each current perishable product according to the effective expiration date.

2. The method according to claim 1, wherein the method comprises:
receiving the package information comprising a nominal expiration date of each current perishable product.

3. The method according to claim 1, wherein the method comprises:
receiving one or more product manifests corresponding to the product identifier of each current perishable product from at least one remote computing machine via the telecommunication network; and
controlling the usage of each current perishable product according to the product manifests thereof.

4. The method according to claim 3, wherein said receiving one or more product manifests comprises:
receiving a description and/or an indication of one or more external events corresponding to the product identifier of each current perishable product, the external events affecting the usage of the current perishable product independently of a handling of the package thereof.

5. The method according to claim 1, wherein the method comprises, for each current perishable product comprising a plurality of product doses packaged individually in corresponding compartments of the package:
receiving the package information comprising an indication of a remaining number of the product doses of the current perishable product; and
controlling the usage of the current perishable product according to the remaining number of the product doses thereof.

6. The method according to claim 1, wherein the method comprises:
maintaining a product repository according to the package information of each current perishable product.

7. A system for controlling usage of one or more perishable products, the system comprising,
a computer readable storage medium configured to store instructions;
an input/output unit configured to receive input and present output; and
a processor communicatively coupled to the computer readable storage medium and the input/output unit and configured to execute the instructions, which, when executed by the processor, cause the processor to:
broadcast an interrogation signal via the input/output unit, the interrogation signal having a transmission range around the input/output unit;

receive, from a control unit associated with a package of each current one of the perishable products being within the transmission range, package information of the current perishable product in response to the interrogation signal, the package information comprising an indication of one or more package events that may affect a duration of the current perishable product being sensed by one or more sensors associated with the package, the package information comprising a product identifier of each current perishable product;

receive an expiration rule corresponding to the product identifier of each current perishable product, the expiration rule received from at least one remote computing machine via a telecommunication network;

calculate an effective expiration date of each current perishable product according to the expiration rule based on the package information thereof; and control the usage of each current perishable product according to the effective expiration date.

8. The system according to claim 7, wherein the processor is further configured to receive the package information comprising a nominal expiration date of each current perishable product.

9. The system according to claim 7, wherein the processor is further configured to:

receive, via the input/output unit, one or more product manifests corresponding to the product identifier of each current perishable product from at least one remote computing machine via a telecommunication network; and control the usage of each current perishable product according to the product manifests thereof.

10. The system according to claim 9, wherein receiving one or more product manifests comprises:

receiving a description and/or an indication of one or more external events corresponding to the product identifier of each current perishable product, the external events affecting the usage of the current perishable product independently of a handling of the package thereof.

11. The system according to claim 7, wherein, for each current perishable product comprising a plurality of product doses packaged individually in corresponding compartments of the package, the processor is further configured to:

receive the package information comprising an indication of a remaining number of the product doses of the current perishable product; and control the usage of the current perishable product according to the remaining number of the product doses thereof.

12. The system according to claim 7, wherein the processor is further configured to maintain a product repository according to the package information of each current perishable product.

13. A computer program product for controlling usage of one or more perishable products, the computer program product comprising a computer readable storage medium having program instructions embodied therewith, wherein when executed by a processor, the program instructions cause the processor to:

broadcast an interrogation signal, the interrogation signal having a transmission range;

receive, from a control unit associated with a package of each current one of the perishable products being within the transmission range from the smart portable device, package information of the current perishable product in response to the interrogation signal, the package information comprising an indication of one or more package events that may affect a duration of the current perishable product being sensed by one or more sensors associated with the package, the package information comprising a product identifier of each current perishable product;

receive an expiration rule corresponding to the product identifier of each current perishable product, the expiration rule received from at least one remote computing machine via a telecommunication network;

calculate an effective expiration date of each current perishable product according to the expiration rule based on the package information thereof; and control the usage of each current perishable product according to the effective expiration date.

14. The computer program product according to claim 13, wherein the program instructions are further configured to cause the processor to:

receive the package information comprising a nominal expiration date of each current perishable product.

15. The computer program product according to claim 13, wherein the program instructions are further configured to cause the processor to:

receive one or more product manifests corresponding to the product identifier of each current perishable product from at least one remote computing machine via a telecommunication network; and control the usage of each current perishable product according to the product manifests thereof.

16. The computer program product according to claim 15, wherein said receiving one or more product manifests comprises:

receiving a description and/or an indication of one or more external events corresponding to the product identifier of each current perishable product, the external events affecting the usage of the current perishable product independently of a handling of the package thereof.

17. The computer program product according to claim 13, wherein, for each current perishable product comprising a plurality of product doses packaged individually in corresponding compartments of the package, the program instructions are configured to cause the processor to:

receive the package information comprising an indication of a remaining number of the product doses of the current perishable product; and control the usage of the current perishable product according to the remaining number of the product doses thereof.

18. The computer program product according to claim 13, wherein the program instructions are further configured to cause the processor to:

maintain a product repository according to the package information of each current perishable product.

* * * * *